United States Patent
Schumann (10) Patent No.: US 12,306,391 B2
(45) Date of Patent: May 20, 2025

(54) MICROSCOPE AND METHOD FOR OPERATING A MICROSCOPE

(71) Applicant: LEICA MICROSYSTEMS CMS GMBH, Wetzlar (DE)

(72) Inventor: Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 676 days.

(21) Appl. No.: 17/611,587

(22) PCT Filed: May 28, 2020

(86) PCT No.: PCT/EP2020/064797
§ 371 (c)(1),
(2) Date: Nov. 16, 2021

(87) PCT Pub. No.: WO2020/249400
PCT Pub. Date: Dec. 17, 2020

(65) Prior Publication Data
US 2022/0229279 A1    Jul. 21, 2022

(30) Foreign Application Priority Data
Jun. 13, 2019 (DE) .................. 10 2019 116 114.2

(51) Int. Cl.
G02B 21/00 (2006.01)
G02B 21/02 (2006.01)
G02B 27/00 (2006.01)

(52) U.S. Cl.
CPC ..... G02B 21/0072 (2013.01); G02B 21/0048 (2013.01); G02B 21/008 (2013.01); G02B 21/02 (2013.01); G02B 27/0068 (2013.01)

(58) Field of Classification Search
CPC ............ G02B 21/0072; G02B 21/0048; G02B 21/008; G02B 21/02; G02B 27/0068;
(Continued)

(56) References Cited

U.S. PATENT DOCUMENTS

2013/0010367 A1    1/2013    Schek
2015/0009491 A1*   1/2015    Feng ............... G02B 21/006
                                                    356/123
(Continued)

FOREIGN PATENT DOCUMENTS

DE    102014101762 A1    8/2015
DE    102011051677 B4    12/2016
(Continued)

OTHER PUBLICATIONS

Ue Yoshihiro et al.: "A spherical aberration-free microscopy system for live brain imaging," Biochemical and Biophysical Research Communications, Elsevier, Amsterdam, NL, vol. 500, Nr. 2, Apr. 18, 2018 (Apr. 18, 2018), pp. 236-241, XP085386551.
(Continued)

Primary Examiner — Mustak Choudhury
(74) Attorney, Agent, or Firm — LEYDIG, VOIT & MAYER, LTD.

(57) ABSTRACT

A microscope is provided. The microscope includes a lens system comprising a lens unit, which is adjustable along an optical axis of the lens system to correct an imaging error. The microscope further includes a motor-actuatable adjustment device, which is configured to adjust the lens unit along the optical axis. The microscope also includes a processor and a scanning unit, which is configured to deflect a light beam used for the image recording. The processor is configured to compare a position of an image which has been recorded after a correction adjustment of the lens unit to reference data, detect a change of the position of the image due to the correction adjustment of the lens unit based on the comparison, and activate the scanning unit in such a way that the change of the position of the image is at least partially compensated for.

14 Claims, 3 Drawing Sheets

(58) Field of Classification Search
CPC ...... G02B 7/023; G02B 7/028; G02B 21/002; G02B 21/244; G02B 21/248
See application file for complete search history.

(56) References Cited

U.S. PATENT DOCUMENTS

| | | | | |
|---|---|---|---|---|
| 2016/0313545 | A1* | 10/2016 | Kondo | .................. G02B 21/08 |
| 2016/0343542 | A1* | 11/2016 | Konishi | ................ H01J 37/222 |
| 2017/0059840 | A1 | 3/2017 | Tamano | |
| 2017/0168280 | A1 | 6/2017 | Schumann et al. | |

FOREIGN PATENT DOCUMENTS

| | | | |
|---|---|---|---|
| JP | H1152252 | A | 2/1999 |
| JP | 2006023494 | A | 1/2006 |
| JP | 4245869 | B2 | 4/2009 |
| JP | 2016017880 | A | 2/2016 |
| JP | 2016206534 | A | 12/2016 |
| JP | 2017044871 | A | 3/2017 |
| JP | 2018063291 | A | 4/2018 |

OTHER PUBLICATIONS

Bio-Equip, "Multiphoton Laser Scanning Microscope," Bio-Equip in China, Nov. 15, 2018 (Nov. 15, 2018), XP055720705, pp. 1-13.
Matthew J. Parry-Hill and Michael W. Davidson, "Adjustment of Objective Correction Collars—MicroscopyU," Aug. 3, 2016 (Aug. 3, 2016), XP055720715, Nikon, Japan, pp. 1-3.
Wikipedia: "Digital image correlation and tracking," Feb. 5, 2019 (Feb. 5, 2019), XP055720735, Wikipedia, US, pp. 1-6.

* cited by examiner

MICROSCOPE AND METHOD FOR OPERATING A MICROSCOPE

CROSS-REFERENCE TO PRIOR APPLICATIONS

This application is a U.S. National Phase application under 35 U.S.C. § 371 of International Application No. PCT/EP2020/064797, filed on May 28, 2020, and claims benefit to German Patent Application No. DE 10 2019 116 114.2, filed on Jun. 13, 2019. The International Application was published in German on Dec. 17, 2020 as WO 2020/249400 under PCT Article 21(2).

FIELD

The invention relates to a microscope, comprising a lens system having a lens unit which is adjustable along the optical axis of the lens system to correct an imaging error, a motor-actuatable adjustment device, which is designed to adjust the lens unit along the optical axis, and a scanning unit, which is designed to deflect a light beam used for image recording. The invention furthermore relates to a method for operating such a microscope.

BACKGROUND

Microscope objectives are known which have an adjustment device, using which a lens unit typically designed as a displaceable lens group may be moved along the optical axis to correct imaging errors. In particular, such a correction adjustment executable manually or by motor is used to eliminate spherical aberrations which are caused by index of refraction mismatches.

A microscope objective is known from DE 10 2011 051 677 B4, which comprises a lens system having a lens unit adjustable via a motor-actuatable adjustment device. For the correction adjustment, the frame of the lens unit is displaceably mounted inside a guide sleeve along the optical axis. The fitting accuracy cannot be arbitrarily high in this case, i.e., the gap between the frame of the lens unit and the guide sleeve cannot be arbitrarily small, since otherwise displaceability is no longer provided.

Due to the gap dimension between the frame of the lens unit and the guide sleeve, a lateral offset and/or a tilt of the lens unit in the guide sleeve can also occur even during a motor displacement of the lens unit along the optical axis. This disadvantageously in turn results in a position change of an image recorded after the correction adjustment, i.e., a lateral offset. This worsens the quality of the image recording. Furthermore, it makes a comparison to other images which are generated, for example, in a tomographic recording or to reference data in general difficult, inaccurate, or even impossible.

SUMMARY

In an embodiment, the present invention provides a lens system comprising a lens unit, which is adjustable along an optical axis of the lens system to correct an imaging error, a motor-actuatable adjustment device, which is configured to adjust the lens unit along the optical axis, a scanning unit, which is configured to deflect a light beam used for the image recording, and a processor, wherein the processor is configured to: compare a position of an image which has been recorded after a correction adjustment of the lens unit to reference data, detect a change of the position of the image due to the correction adjustment of the lens unit based on the comparison, and activate the scanning unit in such a way that the change of the position of the image is at least partially compensated for.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a microscope and a method for operating a microscope in which the correction adjustment described above is remedied.

In an embodiment, the present invention provides a microscope comprising a lens system having a lens unit which is adjustable along the optical axis of the lens system to correct an imaging error, a motor-actuatable adjustment device, which is designed to adjust the lens unit along the optical axis, and a scanning unit, which is designed to deflect a light beam used for the image recording. According to an embodiment of the invention, the microscope furthermore comprises a processor which is designed to compare the position of an image which has been recorded after a correction adjustment of the lens unit to reference data, to detect a change of the position of the image due to the correction adjustment on the basis of the comparison, and to activate the scanning unit in such a way that the change of the position of the image is at least partially compensated for.

In this way, a change of the image position caused by the correction adjustment is remedied, so that images which were recorded after a correction adjustment can be compared more easily and accurately to previously recorded images during subsequent evaluations and analyses. This is a significant advantage in particular in the automated recording of a sequence of images which is carried out, for example, in the context of a real time recording, a time lapse recording, or an image stack recording. This can also be advantageous in the case of a setting of the correction adjustment on the basis of visual or automated image assessment.

In one preferred embodiment, the processor uses the position of an image which has been recorded before the correction adjustment of the lens unit as reference data for the comparison. For this purpose, the microscope comprises, for example, an image memory for storing image data which the processor uses as reference data for the comparison.

The reference data used for the comparison of the image position are not restricted to the above-mentioned image data, however. The reference data can thus also be provided in another way if they enable the processor to acquire the change of the image position caused by the correction adjustment.

In a further embodiment, the microscope furthermore comprises a reference value memory for storing reference values which the processor uses as reference data for the comparison. This is advantageous in particular if, before the recording of an initial image of an image recording sequence, a correction adjustment takes place and therefore image data of images previously recorded without correction adjustment do not yet exist.

In one advantageous embodiment, the adjustment device is designed to automatically send a feedback signal to the processor after its actuation. The processor can subsequently be triggered automatically by this feedback signal to compare the position of an image which was recorded after the correction adjustment to the reference data and to detect a change of the position of the image due to the correction adjustment on the basis of the comparison and to activate the scanning unit accordingly to compensate for the image position change for a subsequent image recording.

In one preferred embodiment, the processor is designed to calculate compensation setting values for the activation of the scanning unit on the basis of the change of the position of the image. The above-mentioned compensation setting values can be provided, for example, in the form of parameters which are used to implement a so-called panning function. This function is applied in scanning microscopes to displace the image field in a desired manner by way of a corresponding activation of the scanning unit.

In a further embodiment, the processor is designed to ascertain compensation setting values for the activation of the scanning unit on the basis of an assignment table, in which a value for the change of the position of the image is assigned to each compensation setting value. This assignment table can be stored in a memory integrated in the processor or in a memory outside the processor, wherein the processor has access to this memory.

The above-mentioned compensation setting values are advantageously offset values which are added to the activation values, on the basis of which the processor activates the scanning unit to deflect the light beam used for the image recording. The assignment table can also contain items of information about backlash and hysteresis of a compensation adjustment. These data can either be ascertained with the aid of the present microscope system or also in a separate step, for example, an interferometric measurement of the objective.

The microscope is designed, for example, as a confocal microscope or as a multiphoton microscope. In this case, the activation according to the invention of the scanning unit already provided in any case in such a microscope type may be used profitably to achieve the desired compensation of the image position change caused by the correction adjustment. However, it is self-evident that the solution proposed here is also usable in a microscope of another type if a scanning unit is present which may be activated to compensate for the change of the image position.

The processor is preferably designed to carry out an automated recording of a sequence of images in such a way that, before the recording of an initial image of the sequence and/or between a first image and a following second image of the sequence, an actuation of the adjustment device takes place, then a detection of the change of the position of the initial image or the second image, and subsequently an activation of the scanning unit to compensate for the detected change. This embodiment enables an automated compensation of image position changes within a so-called rolling image recording, i.e., within an image sequence which is started with an initial image. Within this image sequence, every time the lens unit is adjusted to correct the imaging error, the scanning unit is preferably activated to compensate for the change of the image position accompanying this adjustment. The position change of the image which is recorded after the respective correction adjustment is ascertained in relation to the position of the image which has possibly been generated before the correction adjustment. If, as in the case of the above-mentioned initial image of the sequence, no image generated before the correction adjustment is available, reference can be made to reference data in another manner, for example, in the form of a preset reference image which has been provided before beginning the recording of the image sequence. Furthermore, it is possible to keep a reference ready in another manner, for example, in the form of a static reference which is ascertained outside the method used for the actual image recording. Such an external reference, to which the image, the position change of which within the image sequence is to be ascertained, is to maintain a predetermined correlation, can be determined, for example, in the course of a special contrast method.

The automated recording of the image sequence preferably takes place in the context of a real time recording, a time lapse recording, or an image stack recording. In the real time recording, the rolling image recording can be used in particular for sample search and for setting the correction adjustment. In contrast, in the case of a time lapse recording or an image stack recording, the correction adjustment can be carried out automatically in the actual image recording process. Finally, the rolling image recording itself can be carried out for the purpose of automating the correction adjustment to use the automation thus achieved later in the image recording process.

In an embodiment, the present invention further provides a method for operating a microscope which comprises the following components: a lens system having a lens unit which is adjustable along the optical axis of the lens system to correct an imaging error; a motor-actuatable adjustment device which is designed to adjust the lens unit along the optical axis; and a scanning unit which is designed to deflect a light beam used for the image recording. In an embodiment, the method according to the invention comprises the following steps: comparing the position of an image which has been recorded after a correction adjustment of the lens unit to reference data; detecting a change of the position of the image due to the correction adjustment of the lens unit on the basis of this comparison; and activating the scanning unit in such a way that the change of the position of the image is at least partially compensated for.

The comparison of the position of the image to the reference data is preferably carried out on the basis of an image evaluation algorithm, in particular on the basis of a cross-correlation algorithm and/or a phase-correlation algorithm. The image evaluation algorithm advantageously uses the image data of the complete image, whereby the comparison of the position of the image in relation to reference data in particular becomes more error tolerant with respect to movements in living samples.

Figure 1:
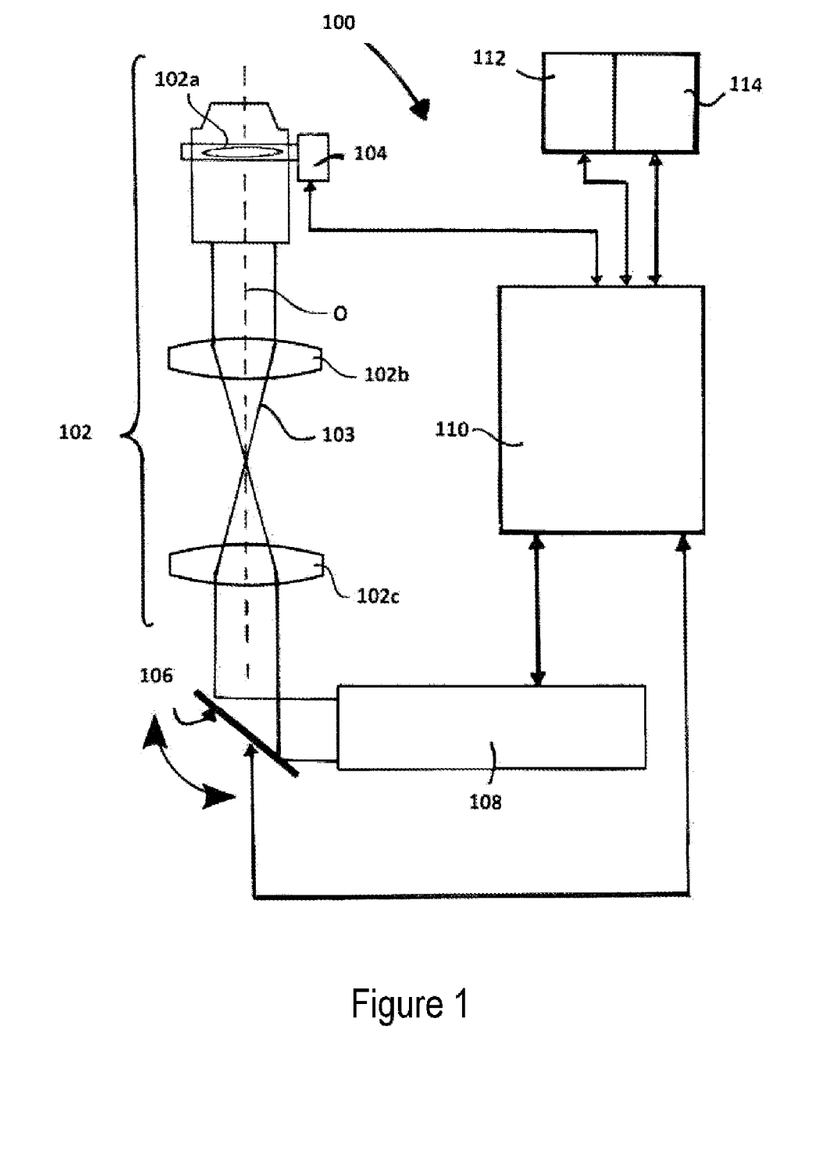
FIG. 1 shows a schematic illustration of a microscope as an exemplary embodiment.

FIG. 1 shows a schematic illustration of a microscope 100 as an exemplary embodiment. The illustrated microscope 100 comprises a lens system 102 having a lens unit 102a, which is adjustable along the optical axis O of the lens system 102 to correct an imaging error, for example, to correct a spherical aberration. The lens system 102 comprises, in addition to the adjustable lens unit 102a, for example, two further lenses 102b, 102c in the illustrated embodiment.

The microscope 100 furthermore comprises a motor-actuatable adjustment device 104, which is designed to adjust the lens unit 102a along the optical axis O. In addition, the microscope 100 has a scanning unit 106 which is designed to deflect a light beam 103 used for the image recording. The scanning unit 106 is embodied here, for example, in the form of one or more electrically adjustable deflection mirrors.

For the exemplary embodiment shown in FIG. 1, it is to be assumed that the microscope 100 is embodied as a confocal scanning microscope. In this case, the lens system 102 of the microscope 100 is used both as an illumination optical unit and also as a detection optical unit. Accordingly, an illumination/detection unit identified in general by 108 in FIG. 1 is to comprise both a light source for the output of illumination light onto a sample and also a detector, for example, in the form of a confocal pinhole having point detector or location-resolved detector for acquiring the detection light originating from the illuminated sample. The scanning unit 106 therefore acts in this arrangement, which is only taken as an example here, both on the illumination light emitted onto the sample and on the detection light originating from the sample. With respect to the detection light, a so-called descanned configuration is implemented by the scanning unit 106, which is capable of descanning the detection light resulting from the scanning sample illumination in terms of a counteraction. The light beam 103 shown in FIG. 1 and used for the image recording can therefore be assigned to the detection light and/or the illumination light.

In addition, the microscope 100 comprises a processor 110, which is designed to compare the position of an image which has been recorded after a correction adjustment of the lens unit 102a to reference data and subsequently, on the basis of the comparison, to detect a change of the position of the image due to the correction adjustment of the lens unit 102a. The position change of the image is caused, for example, by a non-negligible gap dimension which is present between those microscope components by which the lens unit 102a is displaceable along the optical axis O for the correction setting. The adjustment device 104 has a guide sleeve, for example, in which a frame of the lens unit 102a is guided so it is axially displaceable. As a result of this gap dimension, it is not entirely avoidable that the lens unit 102a experiences a certain lateral offset or a tilt in its axial displacement movement with respect to its target positioning relative to the optical axis O, which as a result changes the acquired image position in relation to a target position. The above-mentioned reference data to which the acquired image position is compared reflect this target position.

The processor 110 controls the scanning unit 106 in such a way that the change of the position of the image is at least partially compensated for. For this purpose, the processor 110 is designed, for example, to calculate so-called panning parameters as compensation setting values on the basis of the acquired change of the image position. In the present exemplary embodiment, in which the microscope 100 is embodied as a confocal scanning microscope, the processor 110 makes use of the circumstance that such a scanning microscope has a panning function in any case for optionally setting the image field. In this case, ascertaining the compensation setting values in the course of a calculation is to be understood as solely an example. It is thus also possible in an alternative embodiment to ascertain the compensation setting values for the activation of the scanning unit 106 on the basis of an assignment table, in which a value for the change of the position of the image is assigned to each compensation setting value. This assignment table can be stored in a memory integrated in the processor 110 or in a memory outside the processor 110, wherein the processor 110 has access to this memory.

In a special embodiment, the processor 110 uses the position of an image which has been recorded before the correction adjustment of the lens unit 102a as reference data for the comparison. For this purpose, the microscope 100 comprises an image memory 114 for storing image data, which the processor 110 uses as reference data for the comparison. The processor 110 is thus capable of storing image data in the image memory 114 and reading image data out of the image memory 114.

Alternatively or additionally, the microscope 100 can furthermore comprise a reference value memory 112 for storing reference values, which the processor 110 uses as reference data for the image comparison. The reference memory 112 can be used in particular for the purpose of keeping ready the reference values in the form of an external reference, which has been ascertained outside the actual image recording according to another method, for example, according to a special contrast method. The processor 110 is thus capable of comparing the position of an image which has been recorded after a correction adjustment to reference values and/or to image data of images recorded before the correction adjustment.

The above-mentioned compensation setting values are advantageously offset values which are added to the activation values, on the basis of which the processor 110 activates the scanning unit 106 to deflect the light beam 103 used for the image recording. The compensation setting values can also represent the values of a displacement vector for the activation of the scanning unit 106.

The adjustment device 104 is preferably designed so that after its actuation for the purpose of the axial displacement of the lens unit 108a, it transmits a feedback signal to the processor 110, on the basis of which the processor 110 can establish that a correction adjustment has been carried out. The output of this feedback signal to the processor 110 can take place, for example, via a motor controller integrated in the adjustment device 104.

Figure 2:
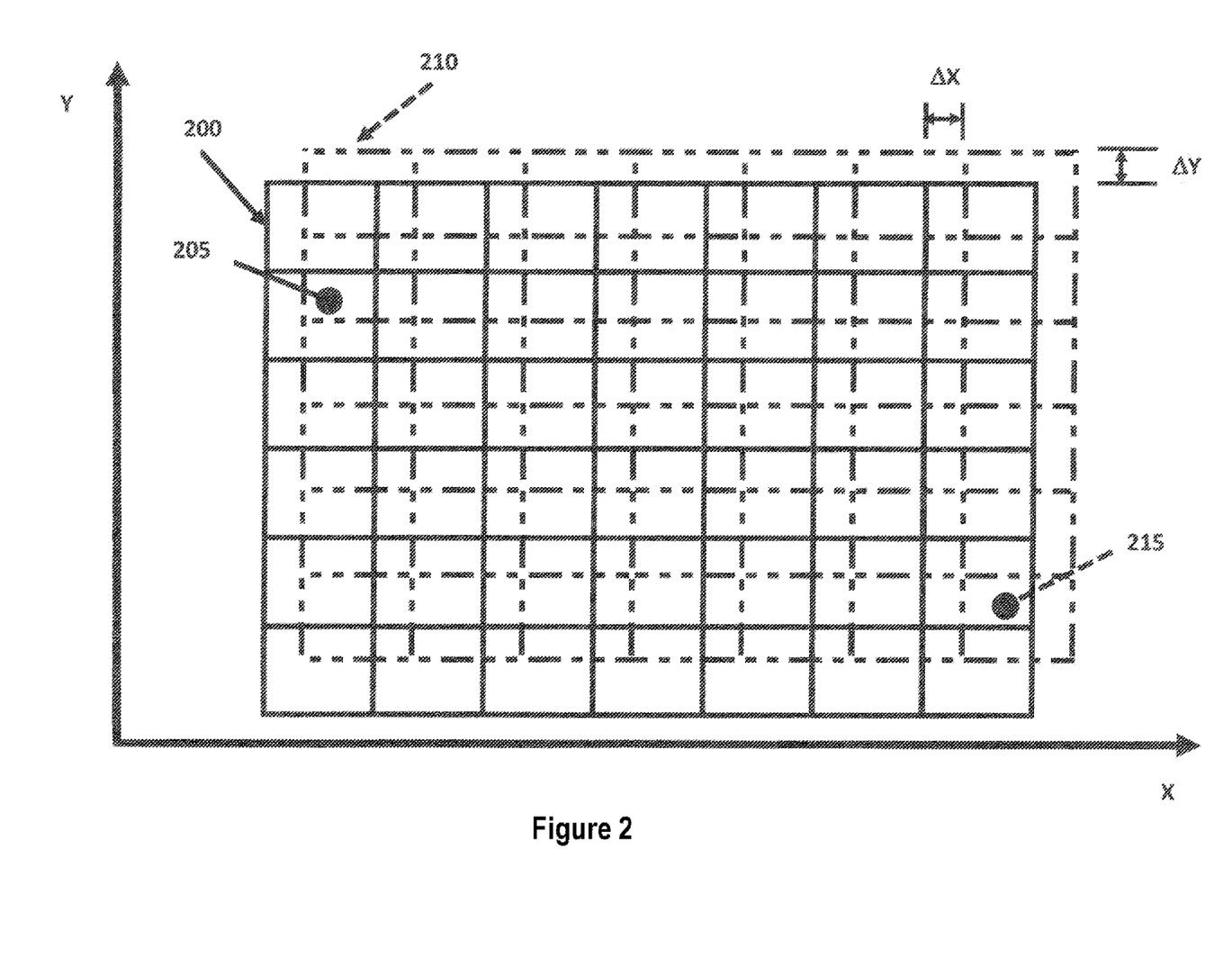
FIG. 2 shows the position of two images, of which one was recorded before the correction adjustment and the other was recorded after the correction adjustment, wherein the two images have a lateral offset in relation to one another.

The image offset caused by the correction adjustment is shown in the schematic illustration according to FIG. 2. In this example, two images 200, 210 are observed, of which the image 200 has been recorded before the correction adjustment and the image 210 has been recorded after the correction adjustment of the lens unit 102. To illustrate the image position change caused by the correction adjustment, reference is made in FIG. 2 to a Cartesian xy coordinate system.

As shown in FIG. 2, each of the images 200, 210 consists of a plurality of image segments 205, 215. In the present example, it is assumed that the plurality of image segments 205, 215 have been recorded in a corresponding plurality of scanning steps, which are executed in a two-dimensional scanning process in the x and y direction by the scanning unit 106. In the example according to FIG. 2, the position of the image 210 which has been recorded after the correction adjustment is offset in relation to the image 200 recorded before the correction adjustment by an amount $\Delta x$ in the x direction and by an amount $\Delta y$ in the y direction.

In the course of a comparison of the images 210, 205 shown in FIG. 2, the processor 110 ascertains the amounts of the lateral offset $\Delta x$ or $\Delta y$ and determines therefrom the compensation setting values to activate the scanning unit 106 to compensate for the image position change.

Figure 3:
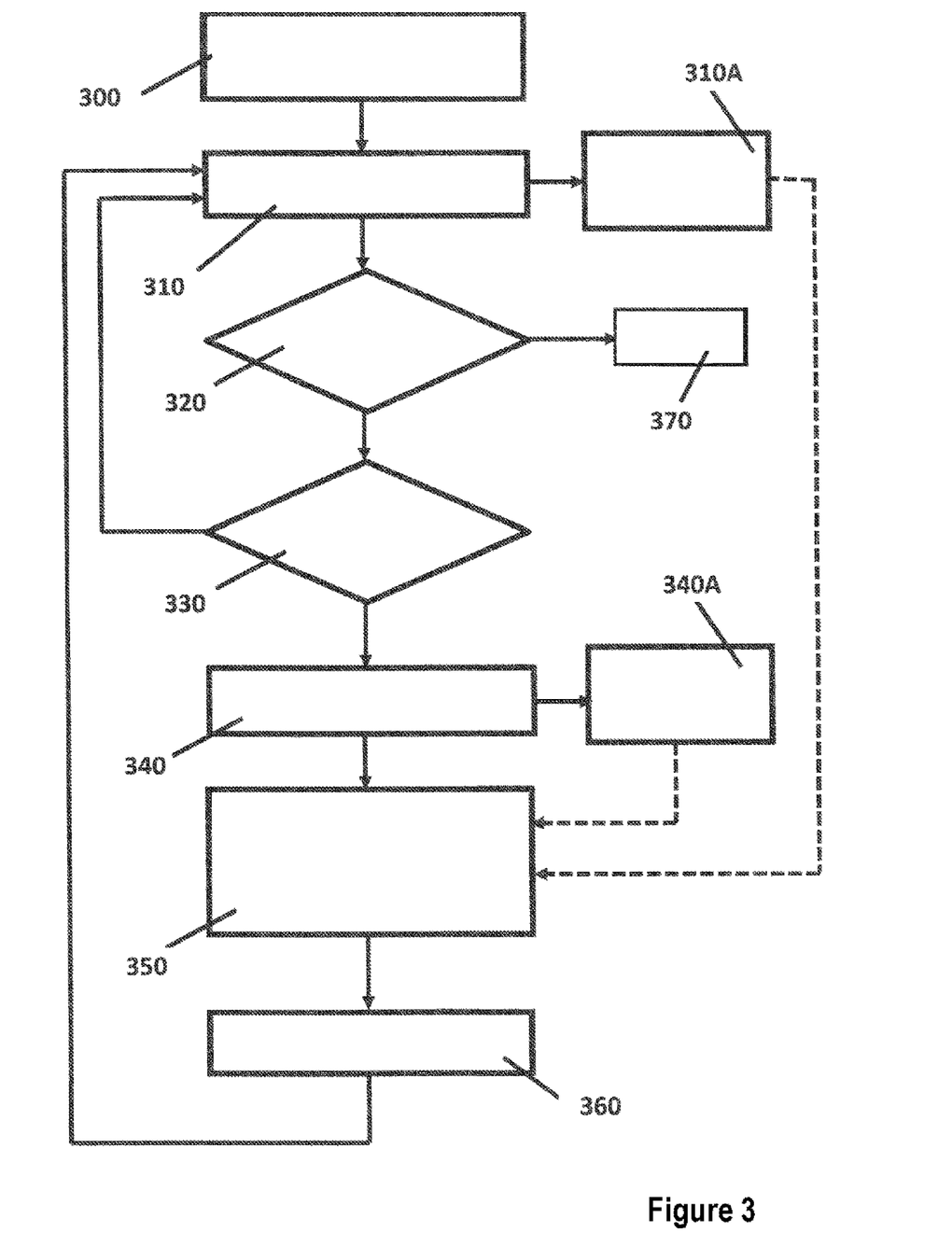
FIG. 3 shows a flow chart of an exemplary method for operating the microscope.

FIG. 3 shows a flow chart for a method for operating the microscope 100 in the context of carrying out an automated image recording sequence.

In step 300, the automated image recording sequence is started. The recording of an initial image subsequently takes place in step 310. Subsequently, the image data of this initial image are stored as reference data in the image memory 114 in step 310A. In step 320, it is queried whether the image recording sequence is ended or whether a further image recording is to take place. If no further image recording is to take place, the image recording sequence is ended in step 370. Otherwise, it is checked in step 330 whether a correction adjustment has been performed or not. If a correction adjustment has been performed, a further image recording thus takes place in step 340, wherein the image data of this image are stored in the image memory 114 for a subsequent comparison in step 340A. Subsequently, in step 350, the processor 110 compares the position of the recorded image to reference data, detects a position change of the image on the basis of the comparison, and ascertains the compensation setting values for the activation of the scanning unit 106 on the basis of the detected position change. For the position comparison, the image data of the image data stored in steps 310A, 340A are transferred to the processor 110, as indicated by dashed lines in FIG. 3. In step 360, a corresponding activation of the scanning unit 106 then takes place on the basis of the ascertained compensation setting values for a subsequent image recording, wherein the compensation setting values for the activation of the scanning unit 106 are provided as offset values. A further image recording now takes place using the compensation setting values in step 310.

If it is established in step 330 that no correction adjustment has been carried out, a further image recording takes place in step 310 immediately, i.e., without carrying out steps 340 to 360.

Although some aspects have been described in the context of a device, it is clear that these aspects also represent a description of the corresponding method, wherein a block or a device corresponds to a method step or a function of a method step. Similarly thereto, aspects which are described in the context of a method step also represent a description of a corresponding block or element or a property of a corresponding device. Some or all method steps can be executed by (or using) a hardware device, which can be, for example, a processor, a microprocessor, a programmable computer, or an electronic circuit. In some exemplary embodiments, one or more of the most important method steps can be executed by such a device.

Depending on determined implementation requirements, exemplary embodiments of the invention can be implemented in hardware or software. The implementation can be carried out using a nonvolatile storage medium such as a digital storage medium, for example, a diskette, a DVD, a Blu-ray, a CD, a ROM, a PROM and EPROM, an EEPROM, or a flash memory, on which electronically readable control signals are stored, which interact (or can interact) with a programmable computer system so that the respective method is carried out. The digital storage medium can therefore be computer readable.

Some exemplary embodiments according to the invention comprise a data carrier having electronically readable control signals which can interact with a programmable computer system, so that one of the methods described herein is carried out.

In general, exemplary embodiments of the present invention can be implemented as a computer program product having a program code, wherein the program code acts to execute one of the methods when the computer program product runs on a computer. The program code can be stored, for example, on a machine-readable carrier.

Further exemplary embodiments comprise the computer program for carrying out one of the methods described herein, which is stored on a machine-readable carrier.

In other words, one exemplary embodiment of the present invention is therefore a computer program having a program code for carrying out one of the methods described herein when the computer program runs on a computer.

A further exemplary embodiment of the present invention is therefore a storage medium (or a data carrier or a computer-readable medium), which comprises a computer program stored thereon for executing one of the methods described herein when it is executed by a processor. The data carrier, the digital storage medium, or the recorded medium are generally tangible and/or not seamless. A further exemplary embodiment of the present invention is a device as described herein which comprises a processor and the storage medium.

A further exemplary embodiment of the invention is therefore a data stream or a signal sequence which represents the computer program for carrying out one of the methods described herein. The data stream or the signal sequence can be configured, for example, so that it is transmitted via a data communication connection, for example, via the Internet.

A further exemplary embodiment comprises a processing means, for example, a computer or a programmable logic device, which is configured or adapted to execute one of the methods described herein.

A further exemplary embodiment comprises a computer on which the computer program for executing one of the methods described herein is installed.

A further exemplary embodiment according to the invention comprises a device or a system which is configured to transmit (for example electronically or optically) a computer program for executing one of the methods described herein to a receiver. The receiver can be, for example, a computer, a mobile device, a storage device, or the like. The device or the system can comprise, for example, a file server for transmitting the computer program to the receiver.

In some exemplary embodiments, a programmable logic device (for example, a field-programmable gate array (FPGA)) can be used to execute some or all functionalities of the methods described herein. In some exemplary embodiments, a field-programmable gate array can cooperate with a microprocessor to carry out one of the methods described herein. In general, the methods are preferably carried out by any hardware device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 microscope
102 lens system
102a lens unit
102b, 102c lenses
103 light beam
104 adjustment device
106 scanning unit
108 illumination/detection unit
110 processor
112 reference value memory
114 image memory
200 image before correction adjustment
205 image segment
210 image after correction adjustment
215 image segment
$\Delta x$, $\Delta y$ image offset
$\varphi$ angle
300-370 method steps

The invention claimed is:
1. A microscope, comprising:
a lens system comprising a lens unit, which is adjustable along an optical axis of the lens system to correct an imaging error,
a motor-actuatable adjustment device, which is configured to adjust the lens unit along the optical axis,
a scanning unit, which is configured to deflect a light beam used for image recording, and
a processor,
wherein the processor is configured to:
compare a position of an image which has been recorded after a correction adjustment of the lens unit to reference data before the correction adjustment of the lens unit,
detect a lateral offset of the position of the image due to the correction adjustment of the lens unit based on the comparison to the reference data, and
activate the scanning unit in such a way that the lateral offset of the position of the image is at least partially compensated for.

2. The microscope according to claim 1, wherein the processor uses the position of an image which has been recorded before the correction adjustment of the lens unit as the reference data for the comparison.

3. The microscope according to claim 1, furthermore comprising a reference value memory for storing reference values, wherein the processor uses the stored reference values as the reference data for the comparison.

4. The microscope according to claim 1, furthermore comprising an image memory for storing image data, wherein the processor uses the stored image data as the reference data for the comparison.

5. The microscope according to claim 1, wherein the adjustment device is configured to transmit a feedback signal to the processor after actuation of the adjustment device.

6. The microscope according to claim 1, wherein the processor is configured to calculate compensation setting values for the activation of the scanning unit based on the lateral offset of the position of the image.

7. The microscope according to claim 6, wherein the compensation setting values are offset values, wherein the processor activates the scanning unit to deflect the light beam used for the image recording based on the offset values.

8. The microscope according to claim 1, wherein the processor is configured to ascertain compensation setting values for the activation of the scanning unit based on an assignment table, in which a value for the lateral offset of the position of the image is assigned to each compensation setting value.

9. The microscope according to claim 1, wherein the processor is configured to carry out an automated recording of a sequence of images in such a way that, before recording of an initial image of the sequence and/or between a first image and a following second image of the sequence, following steps take place: an actuation of the adjustment device, then a detection of the lateral offset of the position of the initial image or the second image, and subsequently an activation of the scanning unit to compensate for the detected lateral offset of the position of the initial image or the second image.

10. The microscope according to claim 9, wherein the processor carries out the automated recording of the sequence in the context of a real time recording, a time lapse recording, or an image stack recording.

11. The microscope according to claim 1, wherein the microscope is a confocal microscope.

12. The microscope according to claim 1, wherein the microscope is a multiphoton microscope.

13. A method for operating a microscope, the microscope comprising
a lens system comprising a lens unit, which is adjustable along an optical axis of the lens system to correct an imaging error,
a motor-actuatable adjustment device, which is configured to adjust the lens unit along the optical axis, and
a scanning unit, which is configured to deflect a light beam used for image recording,
wherein the method comprises:
comparing a position of an image which has been recorded after a correction adjustment of the lens unit to reference data before the correction adjustment of the lens unit,
detecting a lateral offset of the position of the image due to the correction adjustment of the lens unit based on the comparison to the reference data, and
activating the scanning unit in such a way that the lateral offset of the position of the image is at least partially compensated for.

14. The method according to claim 13, wherein comparing the position of the image to the reference data is based on an image evaluation algorithm, wherein the image evaluation algorithm is a cross-correlation algorithm and/or a phase-correlation algorithm.

* * * * *